(12) United States Patent
Vartakavi et al.

(10) Patent No.: US 12,532,038 B2
(45) Date of Patent: *Jan. 20, 2026

(54) CLASSIFYING SEGMENTS OF MEDIA CONTENT USING CLOSED CAPTIONING

(71) Applicant: GRACENOTE, INC., Emeryville, CA (US)

(72) Inventors: Aneesh Vartakavi, Emeryville, CA (US); Lakshika Balasuriya, Walnut Creek, CA (US); Chin-Ting Ko, Dublin, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,817

(22) Filed: Jul. 7, 2023

(65) Prior Publication Data
US 2023/0353797 A1 Nov. 2, 2023

Related U.S. Application Data

(63) Continuation of application No. 17/861,112, filed on Jul. 8, 2022, now Pat. No. 11,736,744, which is a continuation of application No. 17/359,433, filed on Jun. 25, 2021, now Pat. No. 11,418,821.

(60) Provisional application No. 63/147,342, filed on Feb. 9, 2021.

(51) Int. Cl.
*H04N 21/234* (2011.01)
*G06F 40/20* (2020.01)
*G11B 27/34* (2006.01)
*H04N 21/845* (2011.01)
*G06V 20/40* (2022.01)

(52) U.S. Cl.
CPC ....... *H04N 21/23418* (2013.01); *G06F 40/20* (2020.01); *G11B 27/34* (2013.01); *H04N 21/8456* (2013.01); *G06V 20/41* (2022.01); *G06V 20/49* (2022.01)

(58) Field of Classification Search
CPC .......... H04N 21/23418; H04N 21/8456; G06F 40/20; G11B 27/34; G06V 20/49; G06V 20/41
See application file for complete search history.

(56) References Cited

U.S. PATENT DOCUMENTS

2013/0031266 A1* 1/2013 Gilson ............. H04N 21/25891
709/232
2013/0322765 A1* 12/2013 Neumann ............... G06V 20/46
382/197

(Continued)

*Primary Examiner* — Sunghyoun Park
(74) *Attorney, Agent, or Firm* — McDonnell Boehnen Hulbert & Berghoff LLP

(57) ABSTRACT

In one aspect, an example method includes (i) retrieving, from a text index, closed captioning repetition data for a segment of a sequence of media content; (ii) generating features using the closed captioning repetition data; (iii) providing the features as input to a classification model, wherein the classification model is configured to output classification data indicative of a likelihood of the features being characteristic of a program segment; (iv) obtaining the classification data output by the classification model; (v) determining a prediction of whether the segment is a program segment using the classification data; and (vi) storing the prediction for the segment in a database.

21 Claims, 9 Drawing Sheets

(56) References Cited

U.S. PATENT DOCUMENTS

| | | | | |
|---|---|---|---|---|
| 2015/0082349 A1* | 3/2015 | Ishtiaq | ............... | H04N 21/4316 |
| | | | | 725/40 |
| 2016/0037232 A1* | 2/2016 | Hu | ..................... | H04N 21/8455 |
| | | | | 725/34 |
| 2018/0189276 A1* | 7/2018 | Fonseca, Jr. | ......... | H04N 21/812 |
| 2020/0293783 A1* | 9/2020 | Ramaswamy | ........ | G06F 18/256 |
| 2020/0335092 A1* | 10/2020 | Georgiou | ................ | G10L 15/16 |
| 2021/0012145 A1* | 1/2021 | Chaudhari | .......... | G06F 18/2185 |
| 2021/0084369 A1* | 3/2021 | Neumeier | .......... | H04N 21/2353 |

\* cited by examiner

CLASSIFYING SEGMENTS OF MEDIA CONTENT USING CLOSED CAPTIONING

CROSS-REFERENCE TO RELATED APPLICATIONS

This disclosure is a continuation of, and claims priority to, U.S. patent application Ser. No. 17/861,112 filed on Jul. 8, 2022, which claims priority to, U.S. application Ser. No. 17/359,433 filed on Jun. 25, 2021, now U.S. Pat. No. 11,418,821, issued Aug. 16, 2022, which claims priority to U.S. Provisional Patent App. No. 63/147,142 filed on Feb. 9, 2021, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

In various scenarios, a content distribution system can transmit content to a content presentation device, which can receive and output the content for presentation to an end-user. Further, such a content distribution system can transmit content in various ways and in various forms. For instance, a content distribution system can transmit content in the form of an analog or digital broadcast stream representing the content.

In an example configuration, a content distribution system can transmit content on one or more discrete channels (sometimes referred to as stations or feeds). A given channel can include content arranged as a linear sequence of content segments, including, for example, program segments and advertisement segments.

Closed captioning (CC) is a video-related service that was developed for the hearing-impaired. When CC is enabled, video and text representing an audio portion of the video are displayed as the video is played. The text may represent, for example, spoken dialog or sound effects of the video, thereby helping a viewer to comprehend what is being presented in the video. CC may also be disabled such that the video may be displayed without such text as the video is played. In some instances, CC may be enabled or disabled while a video is being played.

CC may be generated in a variety of manners. For example, an individual may listen to an audio portion of video and manually type out corresponding text. As another example, a computer-based automatic speech-recognition system may convert spoken dialog from video to text.

Once generated, CC may be encoded and stored in the form of CC data. CC data may be embedded in or otherwise associated with the corresponding video. For example, for video that is broadcast in an analog format according to the National Television Systems Committee (NTSC) standard, the CC data may be stored in line twenty-one of the vertical blanking interval of the video, which is a portion of the television picture that resides just above a visible portion. Storing CC data in this manner involves demarcating the CC data into multiple portions (referred to herein as "CC blocks") such that each CC block may be embedded in a correlating frame of the video based on a common processing time. In one example, a CC block represents two characters of text. However a CC block may represent more or less characters.

For video that is broadcast in a digital format according to the Advanced Television Systems Committee (ATSC) standard, the CC data may be stored as a data stream that is associated with the video. Similar to the example above, the CC data may be demarcated into multiple CC blocks, with each CC block having a correlating frame of the video based on a common processing time. Such correlations may be defined in the data stream. Notably, other techniques for storing video and/or associated CC data are also possible.

A receiver (e.g., a television) may receive and display video. If the video is encoded, the receiver may receive, decode, and then display each frame of the video. Further, the receiver may receive and display CC data. In particular, the receiver may receive, decode, and display each CC block of CC data. Typically, the receiver displays each frame and a respective correlating CC block as described above at or about the same time.

SUMMARY

In one aspect, an example method is disclosed. The method includes (i) retrieving, by a computing system from a text index, closed captioning repetition data for a segment of a sequence of media content; (ii) generating, by the computing system, features using the closed captioning repetition data; (iii) providing, by the computing system, the features as input to a classification model, wherein the classification model is configured to output classification data indicative of a likelihood of the features being characteristic of a program segment; (iv) obtaining, by the computing system, the classification data output by the classification model; (v) determining, by the computing system, a prediction of whether the segment is a program segment using the classification data; and (vi) storing, by the computing system, the prediction for the segment in a database.

In another aspect, an example non-transitory computer-readable medium is disclosed. The computer-readable medium has stored thereon program instructions that upon execution by a processor, cause performance of a set of acts including (i) retrieving, from a text index, closed captioning repetition data for a segment of a sequence of media content; (ii) generating features using the closed captioning repetition data; (iii) providing the features as input to a classification model, wherein the classification model is configured to output classification data indicative of a likelihood of the features being characteristic of a program segment; (iv) obtaining the classification data output by the classification model; (v) determining a prediction of whether the segment is a program segment using the classification data; and (vi) storing the prediction for the segment in a database.

In another aspect, an example computing system is disclosed. The computing system is configured for performing a set of acts including (i) retrieving, from a text index, closed captioning repetition data for a segment of a sequence of media content; (ii) generating features using the closed captioning repetition data; (iii) providing the features as input to a classification model, wherein the classification model is configured to output classification data indicative of a likelihood of the features being characteristic of a program segment; (iv) obtaining the classification data output by the classification model; (v) determining a prediction of whether the segment is a program segment using the classification data; and (vi) storing the prediction for the segment in a database.

DETAILED DESCRIPTION

I. Overview

In the context of an advertisement system, it can be useful to know when and where advertisements are inserted. For instance, it may be useful to understand which channel(s) an advertisement airs on, the dates and times that the advertisement aired on that channel, etc. Further, it may also be beneficial to be able to obtain copies of advertisements that are included within a linear sequence of content segments. For instance, a user of the advertisement system may wish to review the copies to confirm that an advertisement was presented as intended (e.g., to confirm that an advertisement was presented in its entirety to the last frame). In addition, for purposes of implementing an audio and/or video fingerprinting system, it may be desirable to have accurate copies of advertisements that can be used to generate reference fingerprints.

Still further, in some instances, when media content, such as a television show, is provided with advertisements that are inserted between program segments, it may be useful to obtain a copy of the television show from which the advertisements have been removed. This can allow a fingerprinting system to more granularly track and identify a location in time within the television show when a fingerprint of the television show is obtained from the television show during a scenario in which the television show is being presented without advertisements. The television show might not include advertisements, for instance, when the television show is presented via an on-demand streaming service at a later time than a time at which the television was initially broadcast or streamed.

Disclosed herein are methods and systems for classifying segments of a sequence of media content using closed captioning. In an example method, a computing system can retrieve, from a text index, closed captioning repetition data for a segment of a sequence of media content. The computing system can then generate features using the closed captioning repetition data, and provide the features as input to a classification model. The classification model is configured to output classification data indicative of a likelihood of the features being characteristic of a program segment. Further, the computing system can obtain the classification data output by the classification model, and determine a prediction of whether the segment is a program segment using the classification data. And the computing system can store the prediction for the segment in a database.

Various other features of the example method discussed above, as well as other methods and systems, are described hereinafter with reference to the accompanying figures.

II. Example Architecture

A. Computing Device

Figure 1:
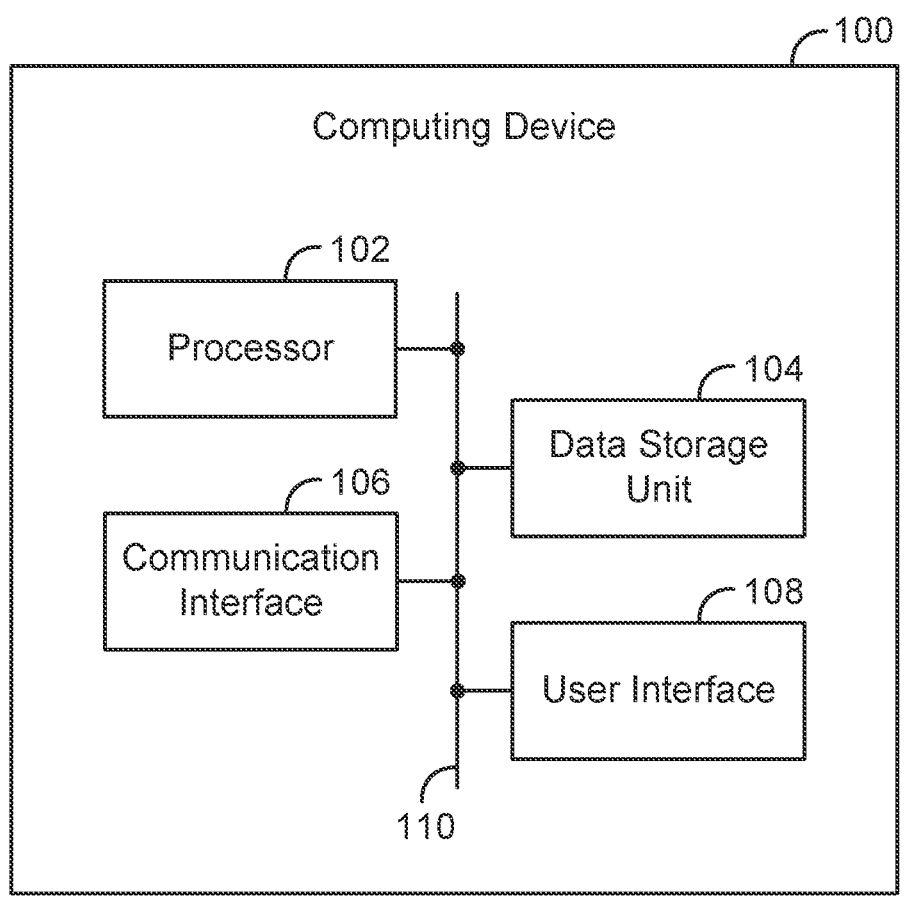
FIG. 1 is a simplified block diagram of an example computing device.

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

B. Computing System

Figure 2:
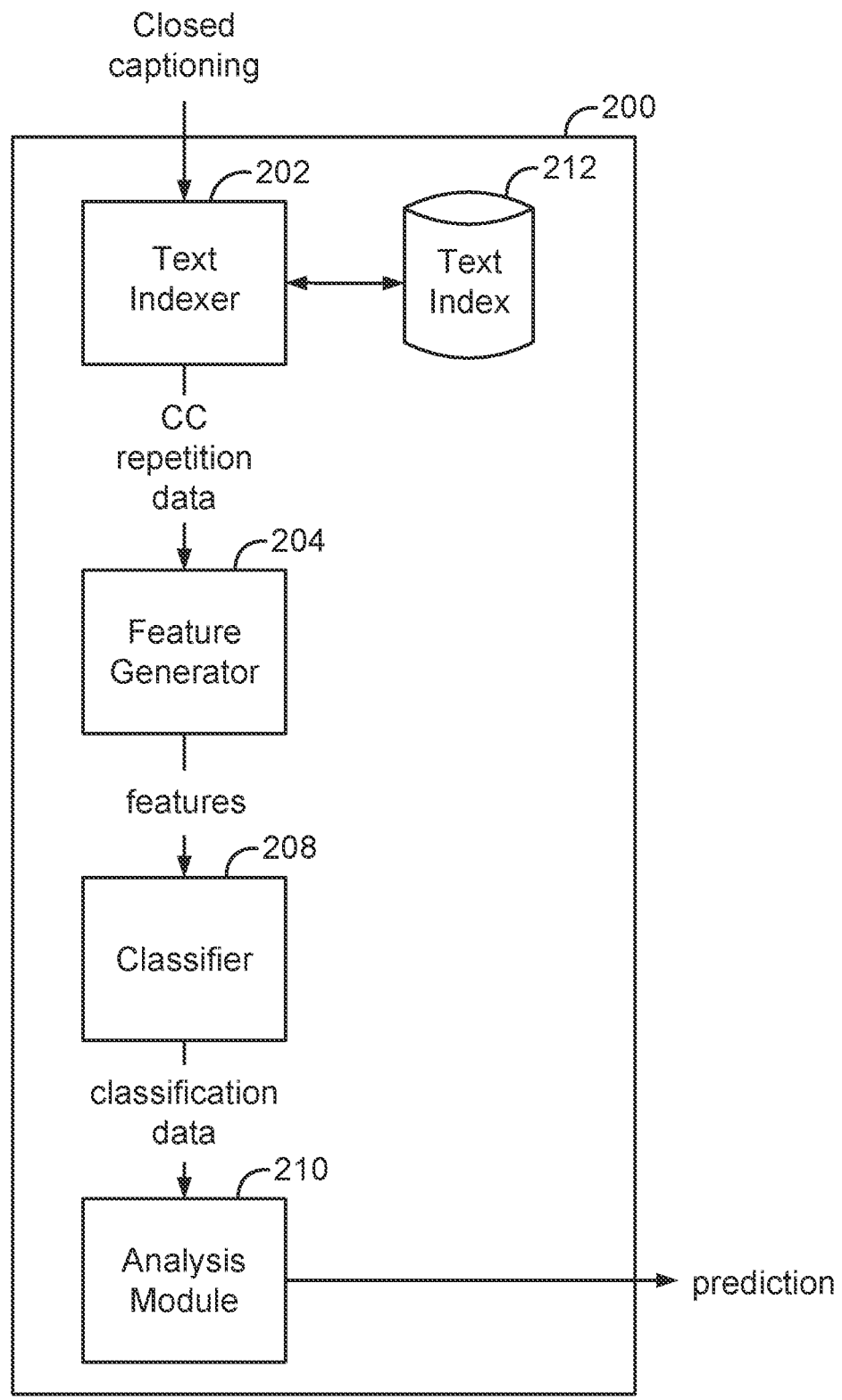
FIG. 2 is a simplified block diagram of an example computing system in which various described principles can be implemented.

FIG. 2 is a simplified block diagram of an example computing system 200. Computing system 200 can perform various acts and/or functions related to using CC to analyze a sequence of media content.

As shown in FIG. 2, computing system 200 can include various components, such as a text indexer 202, a feature generator 204, a classifier 208, and an analysis module 210. Each of the text indexer 202, feature generator 204, classifier 208, and analysis module 210 can be implemented as a computing system. For instance, one or more of the components depicted in FIG. 2 can be implemented using hardware (e.g., a processor of a machine, a field-programmable gate array (FPGA), or an application-specific integrated circuit (ASIC), or a combination of hardware and software. Moreover, any two or more of the components depicted in FIG. 2 can be combined into a single component, and the function described herein for a single component can be subdivided among multiple components.

Computing system 200 can receive closed captioning for a sequence of media content, analyze the closed captioning, and output information regarding the segment. For instance, computing system 200 can use closed captioning for a segment of the sequence of media content to classify whether the segment is an advertisement segment or a program segment. The segment of the sequence of media content can be part of an audio sequence or a video sequence, such as a linear sequence of content segments transmitted on one or more discrete channels (sometimes referred to as stations or feeds).

Additionally or alternatively, computing system 200 can use closed captioning to identify transitions within the sequence of media content between program segments and advertisement segments. For instance, computing system 200 can include a segment identifier (not shown) that is configured to identify transitions between program segments and advertisements, transitions between program segments, and/or transitions between advertisement segments.

The closed captioning for the sequence of media content can include text that represents spoken dialog, sound effects, or music, for example. By way of example, closed captioning can include lines of text, and each line of text can have a timestamp indicative of a position within the sequence of media content. In addition, closed captioning can include associated closed captioning metadata. The closed captioning metadata can identify a channel on which the sequence of media content is presented and/or a date and time that the sequence of media content is presented.

In line with the discussion above, computing system 200 can be configured to use closed captioning repetition data to analyze a segment of a sequence of media content. To facilitate this analysis, text indexer 202 can be configured to maintain a text index 212. Text index 212 can store closed captioning and corresponding closed captioning metadata for sequences of media content presented on a single channel or multiple channels over a period of time (e.g., one week, eighteen days, one-month, etc.). Some lines of closed captioning are repeated during the period of time. For instance, a line of closed captioning can be repeated multiple times on a single channel and/or multiple times across multiple channels. For such lines of closed captioning as well as lines of closed captioning that are not repeated, the text index can store CC repetition data, such as a count of a number of times the line of closed captioning occurs per channel, per day, and/or a total number of times the line of closed captioning occurs within the text index.

Text indexer 202 can update the counts when new data is added to text index 212. Additionally or alternatively, text indexer 202 can update text index 212 periodically (e.g., daily). With this arrangement, at any given day, text index 212 can store data for a number X days prior to the current day (e.g., the previous ten days, the previous fourteen days, etc.). In some examples, text indexer 202 can post-process text index 212. The post-processing can involve discarding lines or sub-sequences of lines having a count that is below a threshold (e.g., five). This can help reduce the size of text index 212.

Text indexer 202 can be configured to retrieve closed captioning repetition data for a segment of a sequence of media content from text index 212. By way of example, the segment can include multiple lines of closed captioning. For each of multiple lines of the closed captioning, text indexer 202 can retrieve, from the text index, a count of a number of times the line of closed captioning occurs in text index 212. Metadata corresponding to the count can specify whether the count is per channel or per day. In some instances, retrieving the closed captioning repetition data can include pre-processing and hashing lines of closed captioning. This can increase the ease (e.g., speed) of accessing the closed captioning repetition data for the closed captioning.

As further shown in FIG. 2, text indexer 202 can provide closed captioning repetition data for a segment to feature generator 204. Feature generator 204 can be configured to generate features from the closed captioning repetition data.

Feature generator 204 can generate features in various ways. For instance, the segment may be a five-second segment that includes multiple lines of closed captioning. Each line of closed captioning can have corresponding closed captioning repetition data. The closed captioning repetition data can include, for each line: a count, a number of days on which the line occurs, and/or a number of channels on which the line occurs.

Feature generator 204 can use the counts to generate features. Example features include: the counts, an average count, an average number of days, and/or an average number of channels. Feature generator 204 can also generate features based on content or characteristics of the lines of closed captioning within the segment, such as an average line length (e.g., number of characters and/or number of words) or a total number of lines within the segment. In sum, the features can include one or any combination of lines of closed captioning, raw closed captioning repetition data, features derived from lines of closed captioning, features, and features derived from closed captioning repetition data.

In some examples, generating the features can include transforming the closed captioning repetition data to windowed features. Transforming the closed captioning repetition data to windowed features can include generating windowed features for sub-segments of the segment using a moving window. For example, for a five-second segment, a three-second moving window can be used. With this approach, a first set of windowed features can be obtained by generating features for the first three seconds of the segment, a second set of windowed features can be obtained by generating features for the second, third, and fourth seconds of the segment, and a third set of windowed features can be obtained by generating features for the last three seconds of the segment. Additionally or alternatively, generating features can include normalizing the features.

After generating the features, feature generator 204 can provide the features as input to classifier 208. Classifier 208 can be configured to process the features using a classification model, and to obtain classification data. The classification data can be indicative of a likelihood of the features being characteristic of a program segment. For instance, for a set of features, the classification data can include a probability indicative of whether the set of features is indicative of a program segment. In an example in which multiple sets of windowed features are provided as input to the classification model, classifier 208 can output classification data for each respective set of windowed features.

Additionally or alternatively, the classification data can be indicative of a likelihood of the features being characteristic of an advertisement segment. For instance, for a set of features, the classification data can include a probability indicative of whether the set of features is indicative of an advertisement segment.

In one example, the classification model can take the form of a neural network. For instance, the classification model can include a recurrent neural network, such as a long short-term memory (LSTM). Alternatively, the classification model can include a feedforward neural network. The classification model can be trained using a training data set that includes features of segments that are known to be program segments and features of segments that are known to be advertisement segments.

Classifier 208 can provide the classification data to analysis module 210. Analysis module 210 can be configured to use the classification data to determine whether the segment is a program segment, and output a prediction of whether the segment is a program segment. For instance, the computing system can compare the classification data to a threshold. Based on a result of the comparing, analysis module 210 can output a prediction of whether the segment is a program segment. In one example, analysis module 210 can interpret a determination that a probability is greater than a threshold (e.g., 65%) to mean that the segment is a program segment. Conversely, analysis module 210 can interpret a determination that a probability is not greater than the threshold to mean that the segment is not a program segment.

In an example in which the classification data includes probabilities for each of multiple sets of windowed features, analysis module 210 can aggregate the classification data to determine whether the segment is a program segment. For instance, analysis module 210 can average the probabilities, and determine whether the average satisfies a threshold. As another example, analysis module 210 can compare each individual probability to a threshold, determine whether more probabilities satisfy the threshold or more probabilities do not satisfy the threshold, and predict whether the segment is a program segment based on whether more probabilities satisfy the threshold or more probabilities do not satisfy the threshold.

Additionally or alternatively, analysis module 210 can be configured to use the classification data to determine whether the segment is an advertisement segment, and output a prediction of whether the segment is an advertisement segment.

III. Example Operations

The computing system 200 and/or components thereof can be configured to perform one or more operations. Examples of these operations and related features will now be described.

A. Operations Related to Creating or Updating a Text Index

Figure 3:
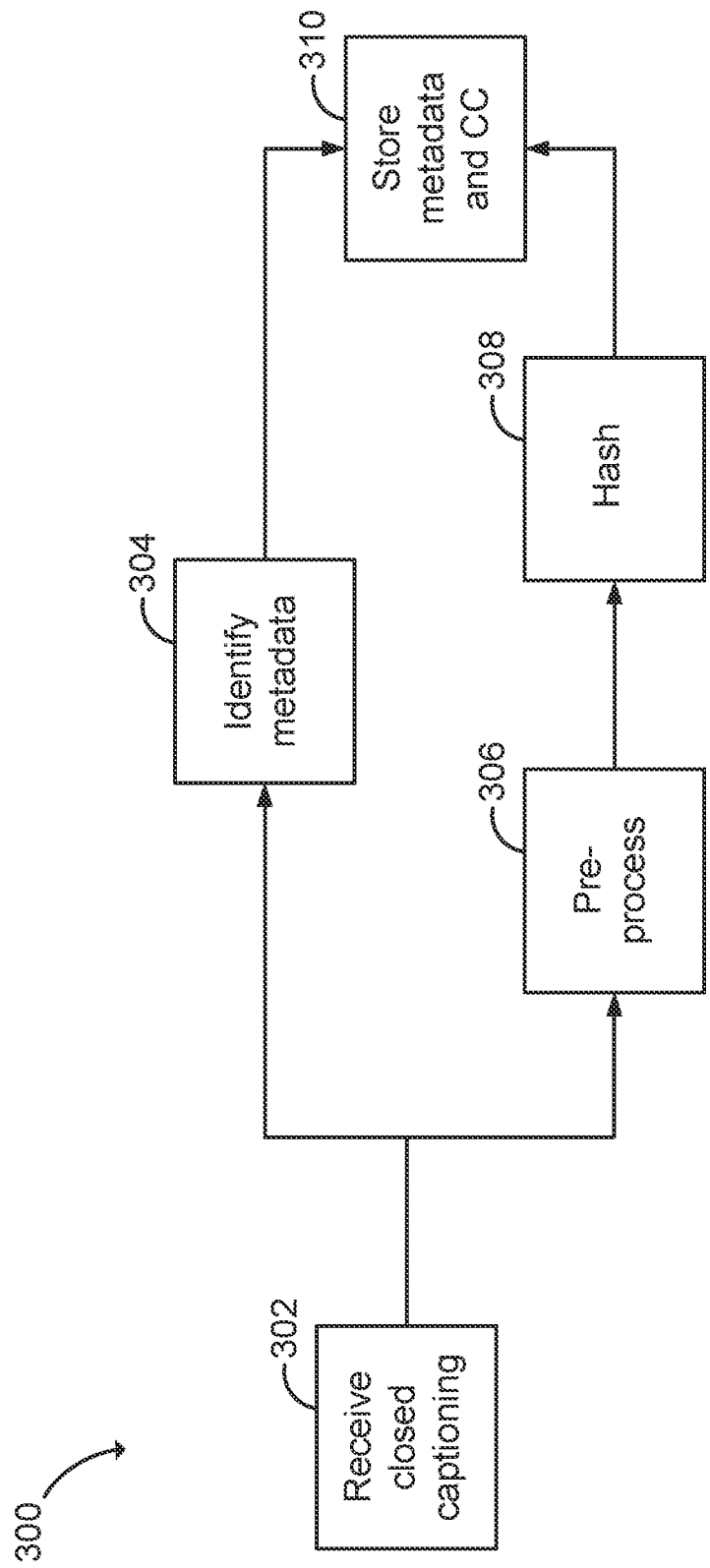
FIG. 3 shows an example process for creating or updating a text index.

FIG. 3 shows an example process 300 for creating or updating a text index. Process 300 can be carried out by text indexer 202 of computing system 200 or, more generally, by a computing system. As shown in FIG. 3, at 302, process 300 includes receiving closed captioning. The closed captioning can include lines of text, and each line of text can have a timestamp indicative of a position within a sequence of media content. In some examples, receiving the closed captioning can involve decoding the closed captioning from a sequence of media content.

At 304, process 300 includes identifying closed captioning metadata. The closed captioning can include associated closed captioning metadata. The closed captioning metadata can identify a channel on which the sequence of media content is presented and/or a date and time that the sequence of media content is presented. In some examples, identifying the closed captioning metadata can include reading data from a metadata field associated with a closed captioning record. In other examples, identifying the closed captioning metadata can include using an identifier of the sequence of media content to retrieve closed captioning metadata from a separate database that maps identifiers of sequences of media content to corresponding closed captioning metadata.

At 306, process 300 includes pre-processing the closed captioning. Pre-processing can involve converting all text to lowercase, removing non-alphanumeric characters, removing particular words (e.g., "is", "a", "the", etc.) and/or removing lines of closed captioning that only include a single word. Pre-processing can also involve dropping text segments that are too short (e.g., "hello").

At 308, process 300 includes hashing the pre-processed closed captioning. Hashing can involve converting a line or sub-sequence of a line of closed captioning to a numerical value or alphanumeric value that makes it easier (e.g., faster) to retrieve the line of closed captioning from the text index. In some examples, hashing can include hashing sub-sequences of lines of text, such as word or character n-grams. Additionally or alternatively, there could be more than one sentence in a line of closed captioning. For example, "Look out! Behind you!" can be transmitted as a single line. Further, the hashing can then include identifying that the line includes multiple sentences, and hashing each sentence individually.

At 310, process 300 includes storing the hashed closed captioning and corresponding metadata in a text index. The text index can store closed captioning and corresponding closed captioning metadata for sequences of media content presented on a single channel or multiple channels over a period of time (e.g., one week, eighteen days, one-month, etc.).

Some lines of closed captioning are repeated over time. For instance, a line of closed captioning can be repeated multiple times on a single channel and/or multiple times across multiple channels. For such lines of closed captioning and lines of closed captioning that are not repeated, the text index can store closed captioning repetition data, such as a count of a number of times the line of closed captioning occurs per channel, per day, and/or a total number of times the line of closed captioning occurs within the text index. In some examples, process 300 can further include updating the closed captioning repetition data. Updating the closed captioning repetition data can involve post-processing the text index to discard lines or sub-sequences of lines having a count that is below a threshold (e.g., five).

B. Operations Related to Retrieving Closed Captioning Repetition Data

Figure 4:
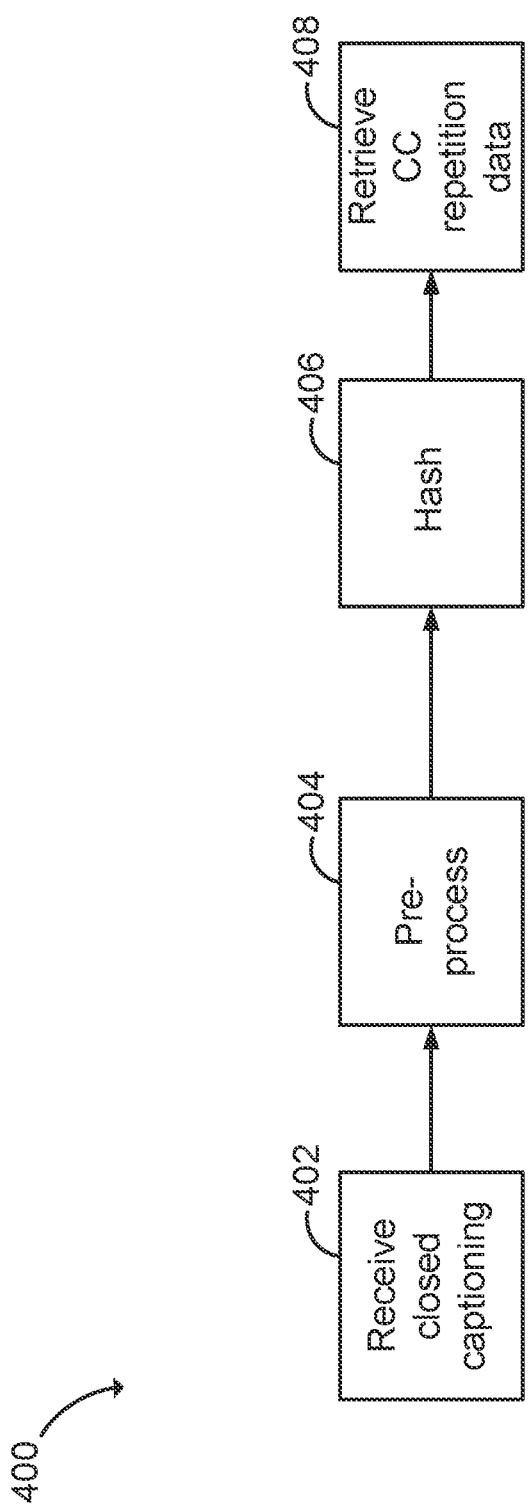
FIG. 4 shows an example process for obtaining closed captioning repetition data.

FIG. 4 shows an example process 400 for obtaining closed captioning repetition data. Like process 300 of Figure, process 400 can be carried out by text indexer 202 of computing system 200 or, more generally, by a computing system. As shown in FIG. 4, at 402, process 400 includes receiving closed captioning. The closed captioning can include one or more lines of closed captioning.

At 404 and 406, process 400 includes pre-processing the closed captioning and hashing the closed captioning. The pre-processing and the hashing can include techniques similar to the pre-processing and hashing techniques utilized when generating the text index from which the closed captioning repetition data will be retrieved. For instance, the pre-processing at 404 and hashing at 406 can involve any of the pre-processing and hashing operations described above with reference to FIG. 3.

At 408, process 400 includes retrieving, from a text index, closed captioning repetition data. For instance, for each of one or more lines of the closed captioning, text indexer 202 can retrieve a count of a number of times the line of closed captioning occurs in the text index. In some examples, the count can be a number of times per day. In other examples, the count can be a number of times per channel. Further, in some instances, multiple counts can be retrieved for a given line of closed captioning, such as a count per day and a count per channel.

C. Operations Related to Classifying a Segment Using Closed Captioning

Figure 5:
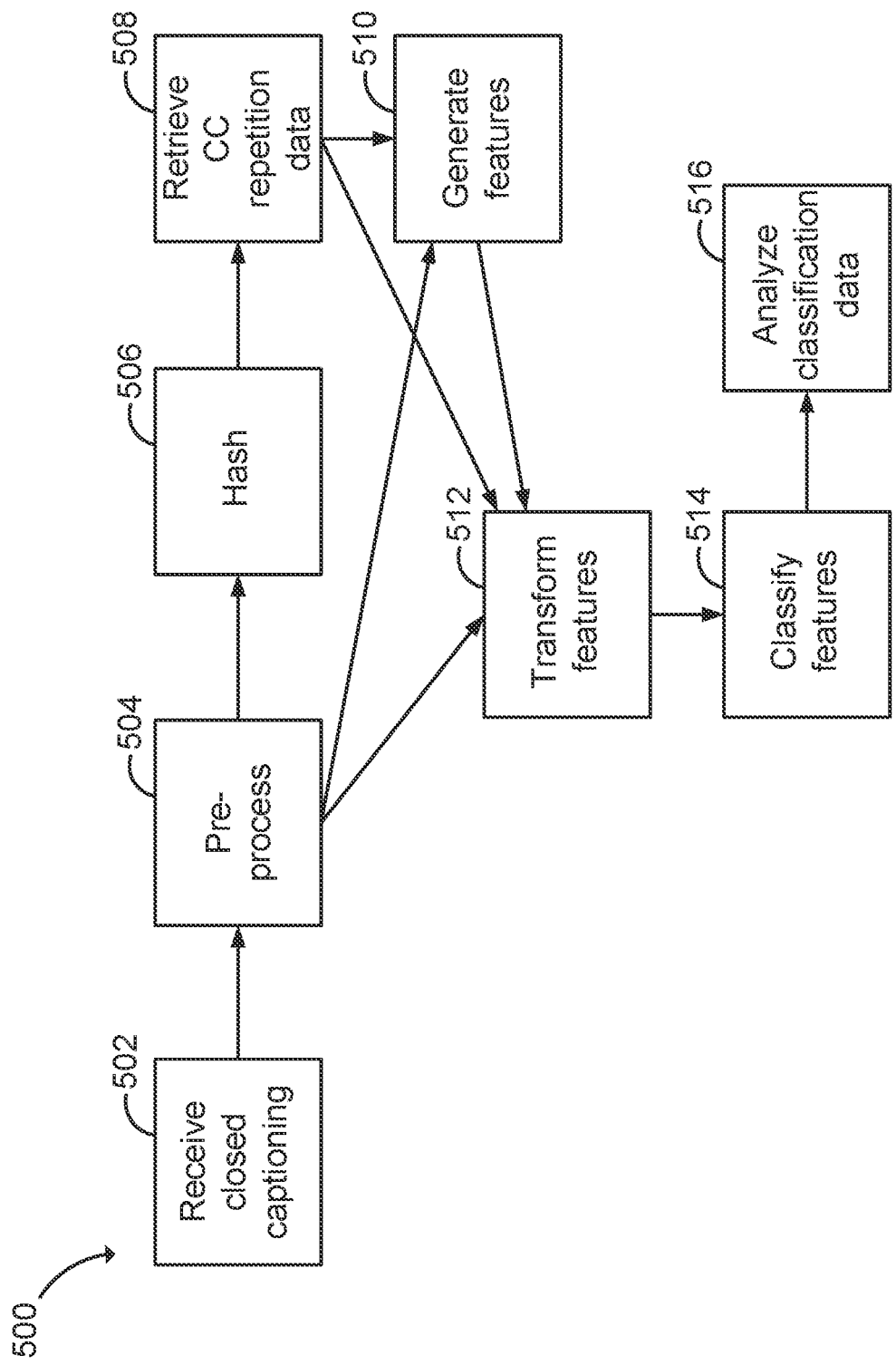
FIG. 5 shows an example process for classifying a segment of a sequence of media content.

FIG. 5 shows an example process 500 for classifying a segment of a sequence of media content. Process 500 can be carried out by a computing system, such as computing system 200 of FIG. 2. As shown in FIG. 5, like process 400 of FIG. 4, at 502, process 500 includes receiving closed captioning, at 502 and 504, process 500 includes pre-processing the closed captioning and hashing the closed captioning, and at 506, process 500 includes retrieving closed captioning repetition data. The closed captioning received at 502 can include closed captioning for a segment of a sequence of media content, and the process 500 can be used to classify the segment of the sequence of media content.

As further shown in FIG. 5, at 510, process 500 includes generating features from closed captioning repetition data. The computing system can generate features in various ways. For instance, the closed captioning may correspond to a five-second segment and includes multiple lines of closed captioning. Each line of closed captioning can have corresponding closed captioning repetition data retrieved from the text index. The closed captioning repetition data can include, for each line: a count, a number of days on which the line occurs, and/or a number of channels on which the line occurs. The computing system can use the counts to generate features. Example features include: the counts, an average count, an average number of days, and/or an average number of channels. Optionally, the computing system can generate features from the closed captioning.

At 512, process 500 includes transforming the features. The features to be transformed can include the features generated at 510. In addition, the features can include lines of closed captioning and/or raw closed captioning repetition data. In sum, the features to be transformed can include one or any combination of lines of closed captioning, raw closed captioning repetition data, features derived from lines of closed captioning, and features derived from closed captioning repetition data.

Transforming the features can involve transforming the generated features to windowed features. Transforming the generated features to windowed features can include generating windowed features for sub-segments of the segment. For example, for a five-second segment, a three-second window can be used. With this approach, a first set of windowed features can be obtained by generating features for the first three seconds of the segment, a second set of windowed features can be obtained by generating features for the second, third, and fourth seconds of the segment, and a third set of windowed features can be obtained by generating features for the last three seconds of the segment. Additionally or alternatively, generating features can include normalizing the features.

As further shown in FIG. 5, at 514, process 500 includes classifying the features. By way of example, the features can be provided as input to a classification model. The classification model can be configured to output classification data indicative of a likelihood of the features being characteristic of a program segment and/or a likelihood of the features being characteristic of an advertisement segment. For instance, the classification model can output a probability that the features are characteristic of a program segment and/or a probability that the features are characteristic of an advertisement segment.

In line with the discussion above, the classification model can take the form of a neural network. For instance, the classification model can include a recurrent neural network, such as a long short-term memory (LSTM). Alternatively, the classification model can include a feedforward neural network.

At 516, process 500 includes analyzing the classification data. For instance, the computing system can use the classification data output by the classification model to determine whether the segment is a program segment and/or whether the segment is an advertisement segment.

By way of example, determining whether the segment is a program segment can involve comparing the classification data to a threshold. In an example in which multiple sets of windowed features are provided as input to the classification model, the classification model can output classification data for each respective set of windowed features. Further, the computing system can then aggregate the classification data to determine whether the segment is a program segment. For instance, the computing system can average the probabilities, and determine whether the average satisfies a threshold. As another example, the computing system can compare each individual probability to a threshold, determine whether more probabilities satisfy the threshold or more probabilities do not satisfy the threshold, and predict whether the segment is a program segment based on whether more probabilities satisfy the threshold or more probabilities do not satisfy the threshold.

In a similar manner, the computing system can compare one or more probabilities to a threshold to determine whether the segment is an advertisement segment.

Figure 6:
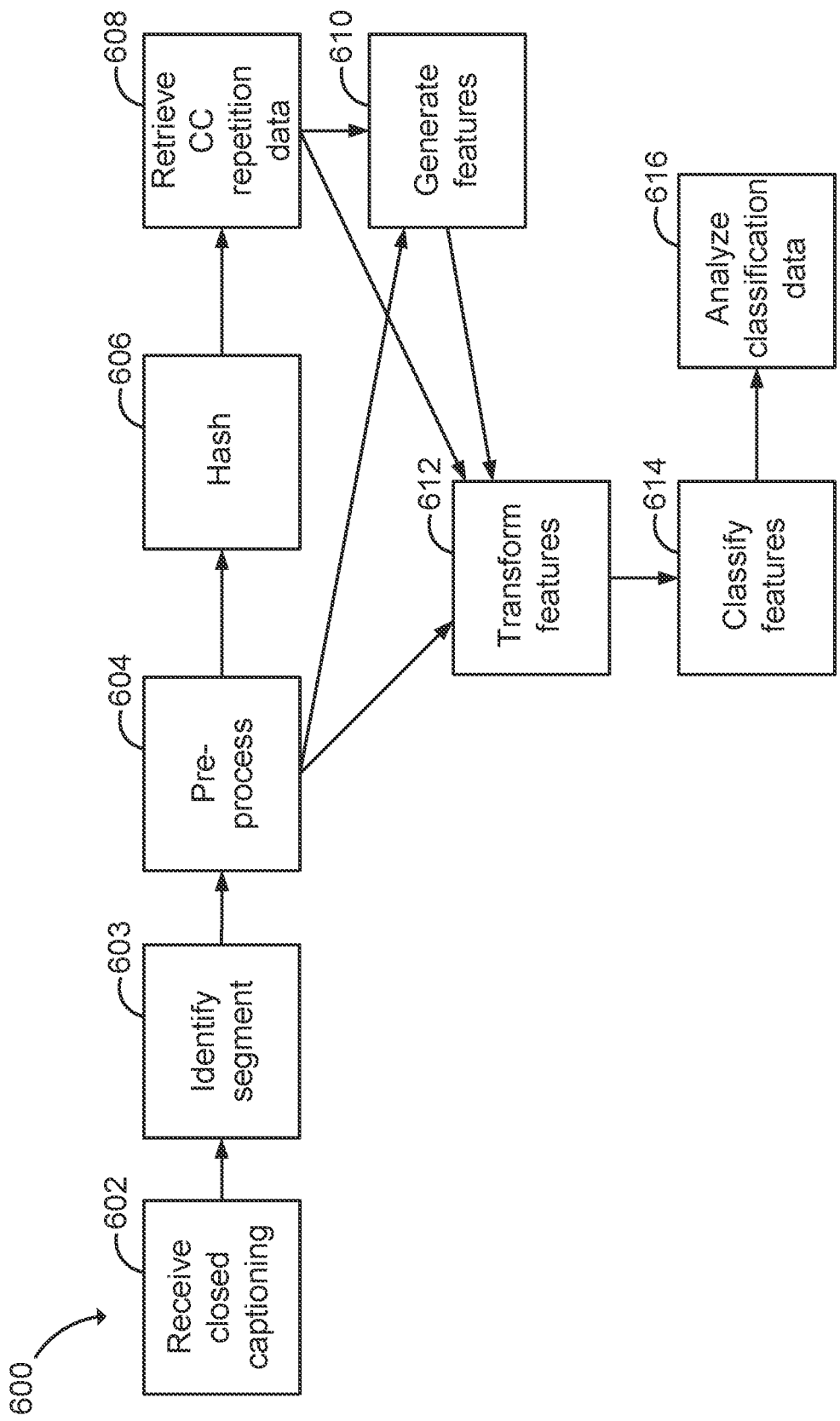
FIG. 6 shows another example process for classifying a segment of a sequence of media content.

FIG. 6 shows another example process 600 for classifying a segment of a sequence of media content. Like process 500 of FIG. 5, process 600 can be carried out by a computing system, such as computing system 200 of FIG. 2. Process 600 is similar to process 500 of FIG. 5 in that process 600 includes pre-processing and hashing closed captioning at 604 and 606, retrieving closed captioning repetition data at 608, generating and transforming features at 610 and 612, classifying features at 614, and analyzing classification data at 616. The operations carried out at 604, 606, 608, 610, 612, 614, and 616 can be similar to the corresponding operations described above with reference to FIG. 5. The operations carried out at 602 and 603, however, are different from process 500 of FIG. 5.

More specifically, as shown in FIG. 6, at 602, process 600 includes receiving closed captioning. The closed captioning can include closed captioning for a sequence of media content. Further, the sequence of media content to which the closed captioning corresponds can include multiple segments, such as an advertisement segment and a program segment, multiple program segments, and/or multiple advertisement segments.

At 603, process 600 includes identifying a segment within the sequence of media content. Identifying the segment within the sequence of media content can involve identifying a beginning of the segment and identifying an end of the segment. In some examples, the sequence of media content can include a plurality of video frames, and the beginning of the segment can be a frame number. Similarly, the end of the segment can also be a frame number.

The computing system can identify a segment in various ways. As one example, the computing system can identify a segment using closed captioning repetition data. As another example, the computing system can identify a segment within the sequence of media content using a language model. After identifying the segment, the computing system can then classify the segment using the other operations of process 600.

D. Operations Related to Identifying a Segment

Figure 7:
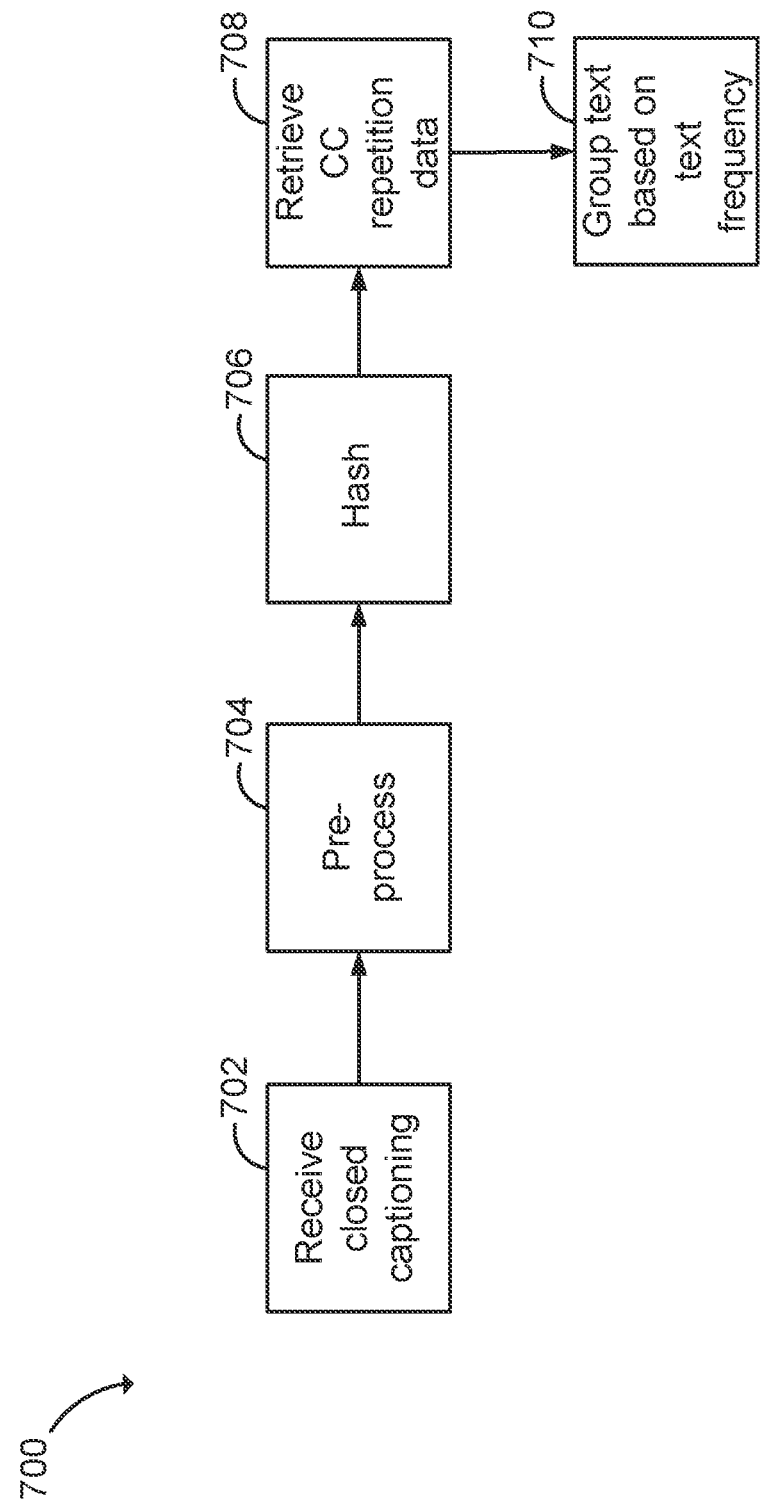
FIG. 7 shows an example process for identifying a segment using closed captioning repetition data.

FIG. 7 shows an example process 700 for identifying a segment using closed captioning repetition data. Process 700 can be carried out by a computing system such as computing system 200 of FIG. 2. As shown in FIG. 7, at 702, process 700 includes receiving closed captioning. The closed captioning can include closed captioning for a sequence of media content. At 704 and 706, process 700 then includes pre-processing and hashing the closed captioning. Further, at 708, process 700 includes retrieving closed captioning repetition data for lines of the closed captioning from a text index.

As further shown in FIG. 7, at 710, process 700 includes grouping neighboring lines of closed captioning based on respective counts for the lines of closed captioning. For instance, closed captioning repetition data for the sequence of media content can include, for each of multiple lines of closed captioning for the sequence of media content, a count of a number of times the line of closed captioning occurs in closed captioning for other sequences of media content. Further, the computing system can then identify the beginning of a segment and the end of a segment by: grouping neighboring lines of closed captioning together based on respective counts for the lines of closed captioning so as to form a group of closed captioning lines.

In some examples, the computing system can group a first line of closed captioning and a second, adjacent line of closed captioning together based on determining that first and second counts for the first line and the second line, respectively, are within a threshold of each other. This initial group can then be expanded by comparing the first count with a count for another line of closed captioning that is adjacent to (e.g., before) the first line, and comparing the second count with a count for another line of closed captioning that is adjacent to (e.g., after) the second line. The expansion process can be repeated until encountering counts for adjacent lines of closed captioning that are not within the threshold of each other or encountering either end of the sequence of media content.

Figure 8:
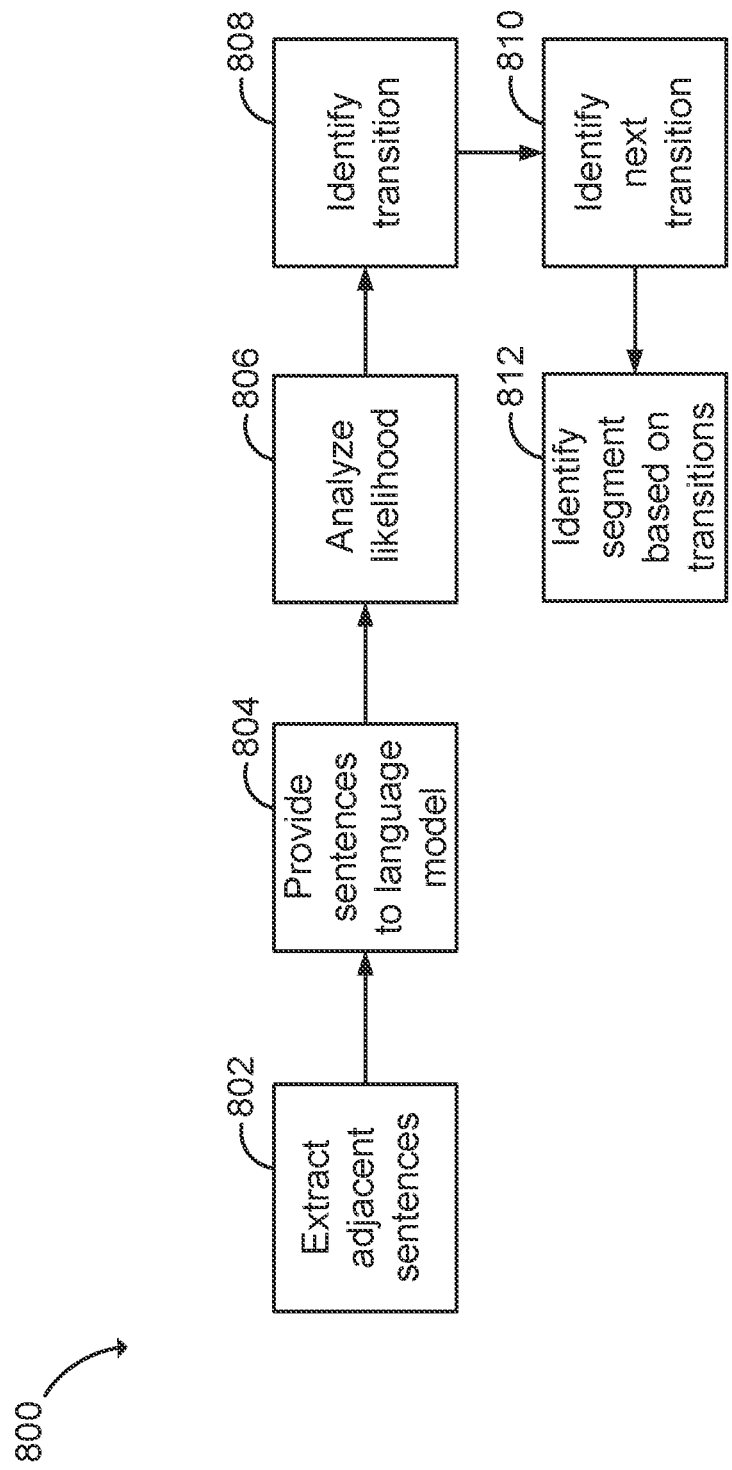
FIG. 8 shows an example process for identifying a segment using a language model.

FIG. 8 shows an example process 800 for identifying a segment using a language model. Process 800 can be carried out by a computing system such as computing system 200 of FIG. 2. As shown in FIG. 8, at 802, process 800 includes extracting two adjacent sentences from closed captioning for a sequence of media content. At 804, process 800 includes providing the two adjacent sentences as input to a language model. In one example, the language model can be trained to output a likelihood of the second sentence following (e.g., immediately following) the first sentence within spoken dialog or a song. One example of a language model is a neural network, such as the bidirectional encoder representations from transformers (BERT) language model.

As further shown in FIG. 8, at 806, process 800 includes analyzing the likelihood output by the language model. For example, the computing system can determine whether a probability output by the language model is less than a threshold. Further, at 808, the process 800 incudes identifying a transition based on a result of the analysis. For instance, the computing system can interpret a determination that a probability output by the language model is less than a threshold to mean that a timestamp associated with a beginning of the second sentence is a beginning of a segment.

At 810, process 800 includes identifying a next transition. The computing system can use a similar technique to identify the next transition. By way of example, the computing system can extract additional pairs of adjacent sentences, which are after the second sentence, from the closed captioning and provide the adjacent pairs to the language model until identifying a timestamp of another likely transition within the closed captioning. For instance, outputs of the language model may indicate that a third sentence is likely to follow the second sentence, but a fourth sentence has a low probability of following the third sentence. Based on the identified low probability for the third sentence and fourth sentence pair, the computing system can identify a timestamp associated with an end of the third sentence as an end of the segment.

At 812, process 800 includes identifying a segment based on the transitions. For instance, the computing system can output data identifying the timestamp associated with the first transition as a beginning of segment and the timestamp associated with the next transition as an end of the segment.

E. Example Method

Figure 9:
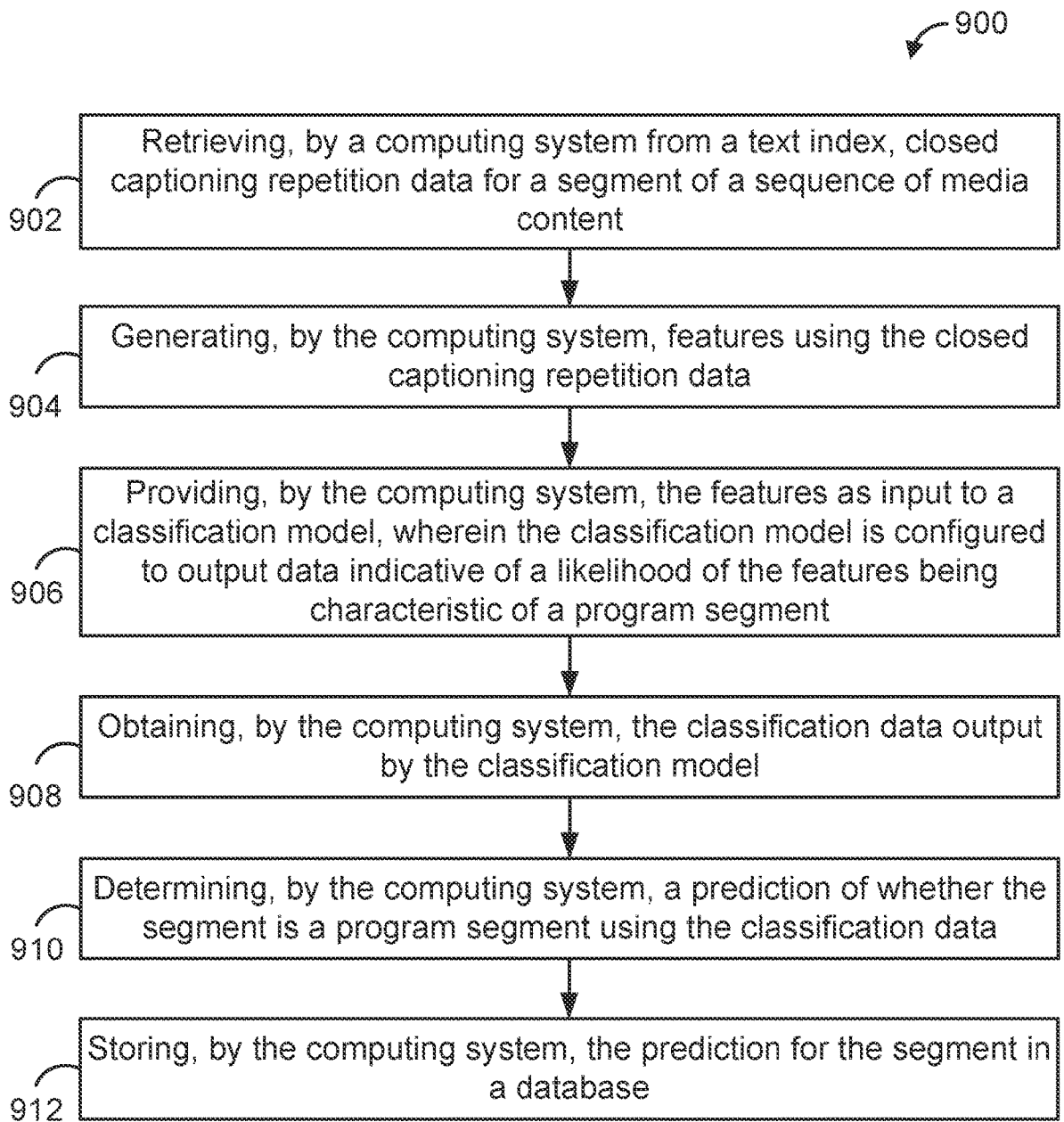
FIG. 9 is a flow chart of an example method.

FIG. 9 is a flow chart of an example method 900. Method 900 can be carried out by a computing system, such as computing system 200 of FIG. 2. At block 902, method 900 includes retrieving, by a computing system from a text index, closed captioning repetition data for a segment of a sequence of media content. At block 904, method 900 includes generating, by the computing system, features using the closed captioning repetition data. At block 906, method 900 includes providing, by the computing system, the features as input to a classification model. The classification model is configured to output classification data indicative of a likelihood of the features being characteristic of a program segment. At block 908, method 900 includes obtaining, by the computing system, the classification data output by the classification model. At block 910, method 900 includes determining, by the computing system, a prediction of whether the segment is a program segment using the classification data. And at block 912, method 900 includes storing, by the computing system, the prediction for the segment in a database.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A non-transitory computer-readable medium having stored thereon program instructions that upon execution by a processor, cause performance of a set of operations comprising:
   retrieving, from a text index, closed captioning data for a segment of a sequence of media content, wherein the closed captioning data comprises a first sentence and a second sentence of the closed captioning data;
   inputting the first sentence and the second sentence of the closed captioning data into a language model;
   in response to inputting the first sentence and the second sentence of the closed captioning data into the language model, determining, by the language model, a likelihood of the second sentence following the first sentence; and
   determining, based on the likelihood, a prediction of whether a timestamp associated with the second sentence of closed captioning is a beginning of the segment and the segment is an advertisement segment.

2. The non-transitory computer-readable medium of claim 1, wherein the closed captioning data comprises closed captioning repetition data.

3. The non-transitory computer-readable medium of claim 1, wherein the prediction comprises a prediction that the segment is an advertisement segment, and wherein the set of operations further comprises:
   based at least on the prediction that the segment is an advertisement segment, obtaining a copy of the sequence of media content from which the segment has been removed; and
   storing the copy of the sequence of media content.

4. The non-transitory computer-readable medium of claim 1, wherein the set of operations further comprises determining, by the language model, classification data associated with the advertisement segment by:
   generating windowed features for sub-segments of the segment; and
   providing the windowed features as input to the language model.

5. The non-transitory computer-readable medium of claim 4, wherein the closed captioning data comprises a count of a number of times a line of closed captioning for the segment occurs in closed captioning for other sequences of media content.

6. The non-transitory computer-readable medium of claim 1, wherein the set of operations further comprises:
   retrieving from the text index closed captioning data for the sequence of media content; and
   identifying, using the closed captioning data for the sequence of media content, a beginning of the segment within the sequence of media content and an end of the segment within the sequence of media content.

7. The non-transitory computer-readable medium of claim 6, wherein:
   the closed captioning data for the sequence of media content comprises, for each of multiple lines of closed captioning for the sequence of media content, a count of a number of times a line of closed captioning occurs in closed captioning for other sequences of media content, and
   identifying the beginning of the segment and the end of the segment using the closed captioning repetition data for the sequence of media content comprises:
     grouping neighboring lines of closed captioning together based on respective counts for the lines of closed captioning so as to form a group of closed captioning lines;
     identifying a timestamp associated with a first line of the group of closed captioning as the beginning of the segment; and
     identifying a timestamp associated with a last line of the group of closed captioning as an end of the segment.

8. The non-transitory computer-readable medium of claim 1, wherein
   prior to inputting the first sentence of closed captioning and the second sentence of closed captioning a into the language model, the language model is trained to output a likelihood of the second sentence of closed captioning following the first sentence of closed captioning.

9. The non-transitory computer-readable medium of claim 1, wherein the set of operations further comprises storing the prediction for the segment in a database.

10. The non-transitory computer-readable medium of claim 1, wherein the language model comprises one or more of: (i) a recurrent neural network; (ii) a feedforward neural network; and (iii) a neural network model.

11. A method comprising:
   retrieving, by a computing system, from a text index, closed captioning data for a segment of a sequence of media content, wherein the closed captioning data comprises a first sentence and a second sentence of the closed captioning data;
   inputting the first sentence and the second sentence of the closed captioning data into a language model;
   in response to inputting the first sentence and the second sentence of the closed captioning data into the language model, determining, by the language model of the computing system, a likelihood of the second sentence following the first sentence; and determining, by the computing system, based on the likelihood, a prediction of whether a timestamp associated with the second sentence of closed captioning is a beginning of the segment and the segment is an advertisement segment.

12. The method of claim 11, wherein the closed captioning data comprises closed captioning repetition data.

13. The method of claim 11, wherein the prediction comprises a prediction that the segment is an advertisement segment, and wherein the method further comprises:
based at least on the prediction being that the segment is an advertisement segment, obtaining a copy of the sequence of media content from which the segment has been removed; and
storing the copy of the sequence of media content.

14. The method of claim 11, wherein the closed captioning data comprises a count of a number of times a line of closed captioning for the segment occurs in closed captioning for other sequences of media content.

15. The method of claim 14, further comprising:
generating the closed captioning data using lines of closed captioning for the other sequences of media content; and
storing the closed captioning data in the text index.

16. The method of claim 11, further comprising determining, by the language model, classification data associated with the advertisement segment by:
generating windowed features for sub-segments of the segment; and
providing the windowed features as input to the language model.

17. The method of claim 11, further comprising:
retrieving from the text index closed captioning data for the sequence of media content; and
identifying, using the closed captioning data for the sequence of media content, a beginning of the segment within the sequence of media content and an end of the segment within the sequence of media content.

18. The method of claim 17, wherein:
the closed captioning data for the sequence of media content comprises, for each of multiple lines of closed captioning for the sequence of media content, a count of a number of times a line of closed captioning occurs in closed captioning for other sequences of media content, and
identifying the beginning of the segment and the end of the segment using the closed captioning data for the sequence of media content comprises:
grouping neighboring lines of closed captioning together based on respective counts for the lines of closed captioning so as to form a group of closed captioning lines;
identifying a timestamp associated with a first line of the group of closed captioning as the beginning of the segment; and
identifying a timestamp associated with a last line of the group of closed captioning as an end of the segment.

19. The method of claim 11, wherein
prior to inputting the first sentence of closed captioning and the second sentence of closed captioning into the language model, the language model is trained to output a likelihood of the second sentence of closed captioning following the first sentence of closed captioning.

20. The method of claim 11, further comprising storing the prediction for the segment in a database.

21. A computing system configured for performing a set of operations comprising:
retrieving, from a text index, closed captioning data for a segment of a sequence of media content, wherein the closed captioning data comprises a first sentence and a second sentence of the closed captioning data;
inputting the first sentence and the second sentence of the closed captioning data into a language model;
in response to inputting the first sentence and the second sentence of the closed captioning data into the language model, determining, by the language model, a likelihood of the second sentence following the first sentence; and
determining, based on the likelihood, a prediction of whether a timestamp associated with the second sentence of closed captioning is a beginning of the segment and the segment is an advertisement segment.

* * * * *